United States Patent [19]

Kunkel et al.

[11] Patent Number: 4,891,260

[45] Date of Patent: Jan. 2, 1990

[54] MULTILAYER FLEXIBLE TRANSFER RIBBON

[75] Inventors: Ernst Kunkel, Hanover; Petra Bubolz, Garbsen; Wolfhard Rutz; Sigo Muschter, both of Hanover, all of Fed. Rep. of Germany

[73] Assignee: Pelikan Aktiengesellschaft, Hanover, Fed. Rep. of Germany

[21] Appl. No.: 221,858

[22] Filed: Jul. 20, 1988

[30] Foreign Application Priority Data

Dec. 3, 1987 [DE] Fed. Rep. of Germany ....... 3741022

[51] Int. Cl.[4] ................................................ B32B 7/06

[52] U.S. Cl. .................................... 428/220; 428/352; 428/354; 428/914; 400/240.1; 400/696; 400/697

[58] Field of Search ............... 428/352, 354, 914, 220; 400/240.1, 696, 697, 237

[56] References Cited

U.S. PATENT DOCUMENTS 3,942,621 3/1976 Karlan ................................ 428/914

FOREIGN PATENT DOCUMENTS 2626891 12/1977 Fed. Rep. of Germany .

2035408 6/1980 United Kingdom ................ 400/696

*Primary Examiner*—Alexander S. Thomas

*Attorney, Agent, or Firm*—Herbert Dubno

[57] ABSTRACT

A transfer ribbon for applying a film of a cover material to a substrate, especially a paper substrate provided with markings to be covered or to be provided with a stripe of color from a coloring agent contained in the cover material, has a carrier-foil strip to which a cover layer is applied and an adhesive layer applied to that cover layer. The adhesion between the cover layer and the foil is less than the adhesion between the cover layer and the adhesive layer so that when the adhesive side of the ribbon is pressed against the substrate, the foil can be withdrawn to leave the cover layer, containing the coloring agent, thereon.

11 Claims, No Drawings

MULTILAYER FLEXIBLE TRANSFER RIBBON

FIELD OF THE INVENTION

Our present invention relates to a multilayer, flexible transfer ribbon for the purpose of adhesively applying a cover material to a substrate and, more particularly, to a transfer ribbon comprising a carrier foil and an adhesive layer which can bond to a substrate so as to apply a cover material thereto to cover erroneous legible matter, for example, or to serve as a marking stripe. The invention also relates to a method of making this ribbon and to a method of using it as a corrective stripe or marking stripe.

BACKGROUND OF THE INVENTION

Numerous systems have been developed for correcting errors in legible matter which may have been applied to a substrate, especially a paper, by typewriting, hand writing, drawing or some other method of applying legible matter to a substrate.

For example, in office use, white-pigmented dispersions containing a volatile organic solvent may be used to correct typewriting or the like by applying the dispersion with a brush. Upon evaporation of the highly volatile organic solvent, an opaque cover layer is formed which renders the underlying legible matter substantially invisible.

However, the solvents used constitute an environmental hazard upon evaporation and it is generally difficult to apply the dispersion with the brush in a fully uniform manner. In addition, one must wait a relatively long time before evaporation is complete and the correction can be overtyped. Mention may also be made of a correcting method in which legible matter is covered by an adhesive strip which is applied to the substrate and consists of a strip of white paper which has the same color as the substrate and is bonded to the latter over the line of legible matter. The paper strip is relatively thick so that truly invisible corrections cannot be made in this fashion. Incidentally, it is not uncommon for the adhesive layer of such strips to be provided with a masking strip which must be pulled away to expose the adhesive layer before the latter is applied to the substrate. Neither approach has been found to be fully satisfactory.

OBJECTS OF THE INVENTION

It is the principal object of the present invention to provide an improved transfer ribbon for applying a cover material, to a substrate, especially as a corrective cover for legible matter, or for marking purposes, whereby the drawbacks of the earlier systems are obviated.

Another object of this invention is to provide an improved transfer ribbon which can be applied in a simple, rapid and efficient manner for the covering of a strip or area of the substrate, to form a uniform thickness of cover material thereon, especially for the correction of erroneous legible matter such as lines or segments of lines of typewriting.

Another object of the invention is to provide an improved method of making the ribbon.

It is also an object of this invention to provide an improved method of correcting typewritten text or like legible matter in a practically invisible manner.

DESCRIPTION OF THE INVENTION

These objects and others which will become more readily apparent hereinafter are attained, in accordance with the present invention, by providing between a carrier foil strip and an adhesive layer, a synthetic-resin-bonded cover layer such that the adhesive layer has a stronger adhesion to the synthetic-resin-bonded cover layer than this cover layer has to the carrier foil strip. In other words, the cover layer is bonded to the adhesive layer with a bonding force which is greater than the bonding force between the cover layers and the carrier foil strip, whereby the cover layer is bonded to the substrate by the adhesive layer and removed from the carrier foil strip upon application of the adhesive-layer side of the transfer ribbon to the substrate.

Since the cover layer can have the minimum thickness required to be opaque and completely block visibility of the legible matter therethrough, the overall thickness of the adhesive and cover layers applied to the substrate may be a small fraction of the thickness of the paper strip corrective tapes used heretofore and may even be less than the thickness of the paint-like layers which have been brushed onto the paper to cover such lines of typewritten text heretofore.

The carrier foil strip which is used in accordance with the invention can be a flexible support of the type heretofore employed for single-use typewriter ribbon supports and thus can be composed of polyethylene terephthalate, polypropylene, polyethylene, polyvinylchloride and polycarbonate foils. The carrier foil may also be silicone-coated paper, the silicone coating serving to reduce the bonding force between the synthetic-resin-bonded cover layer and the support or carrier foil. A silicone coating can be supplemented with or replaced by other antibonding materials, for example, polytetrafluoroethylene.

The adhesive layer can be composed of a commercial pressure-sensitive adhesive, i.e. an adhesive which is tacky and readily bonds to substrates of all kinds with pressure and even slight amounts of pressure. Such materials are elastic and may even be permanently tacky, self-adhesive masses with high adhesion force even when applied at low pressure at room temperature to a variety of common surfaces, especially paper. The adhesive layer is preferably of a type which can be applied in the form of an aqueous dispersion to the cover layer which has previously been applied to the carrier foil and under conditions such that the previously formed synthetic-resin-bonded cover layer will not be redissolved.

The preferred adhesive of this type is an acrylate-based adhesive. Starting materials for the adhesive layer can also include viscous solutions or dispersions of rubber, polyacrylates, polyvinylethers or polyvinylisobutylene.

Preferably, polyacrylate based materials are used and we may mention, specifically, commercially available products like UCECRYL 913R and UCECRYL PC 80 marketed by the firm ucb of Ammelicht, Belgium, and the synthetic-resin dispersion VP 859/6 available from the firm Freihoff.

We have found it to be highly advantageous to form the synthetic-resin-bonded cover layer from a solvent-soluble polyurethane which serves as the binder. We prefer to use for this purpose, an aliphatic single-component polyurethane, especially the commercial product PERMUTHANE U 4924 marketed by the firm Stahl-Chemie.

The synthetic-resin binder is used in solution in an organic solvent, especially toluene or isopropanol. The cover materials, in addition to the binder, can be added to this solution. In general, these materials will be coloring agents in the broadest sense of the word Thus when we refer to "coloring agents" herein, we intend to so designate all materials which can act to provide a color to the film which is applied to the substrate or to act as an opacifier for this film. We, therefore, include dyestuffs and pigments, the latter having characteristics of a filler as well.

When we use the term "dyestuffs" herein, we intend to so designate all soluble coloring agents which can be dissolved in water, organic solvents or binders, to distinguish them from pigments which are largely insoluble.

The color rendition can be direct, i.e. the color of the film applied may be immediately visible, or may develop as a result of activation, for example as fluorescents. In the latter class, for example, we include the coloring agents which fluoresce under daylight or so-called day-glow coloring agents.

When the ribbon of the invention is to serve for the correction of typewritten texts or the like, the synthetic-resin-bonded cover layer will include, as a cover material, especially white pigments which also serve as fillers and opacifiers.

The preferred pigments of this type are titanium white (titanium dioxide), lead white, zinc white, lithopone and antimony white.

If the color of the film applied is to be other than white, appropriate other pigments may be included as well, depending upon the color of the substrate so that the film can match the substrate.

As black pigments, we may use iron oxide black, manganese black, cobalt black, antimony black and carbon black.

Chromatic pigments can be used as well and these can include chrome yellow, red lead, zinc yellow, zinc green, pink red, cadmium red, cobalt blue, Prussian blue, ultramarine, manganese violet, cadmium yellow and Schweinfurth green.

Of course, it is also possible to include organic pigments in the composition and, for this purpose, practically all organic pigments, for example, anthraquinoid, indigoid, phthalocyanine, isoindolinone, metal-complex and alkali blue pigments can be used.

For the purposes of correction of legible matter on a substrate, the pigments are incorporated in the cover layer in relatively large proportion, for example about 4 to 12 parts by weight of pigment per part by weight of the synthetic resin binder.

Such large proportions of pigment result in the fact that the cover layer cannot be self-supporting. In this case, the carrier foil forms the structural support for the correction film until the film is applied to the substrate and, after the cover layer is applied to the substrate, the substrate itself becomes the support.

With the aforedescribed materials of the individual layer, we are able to achieve the desired parameters with respect to flexibility and adhesion. For example, the adhesive force (defined in terms of the adhesion work in accordance with the Dupré equation, see K. L. WOLF, *Physik und Chemie der Grenzflachen,* Springer Verlag 1957, 164) between the adhesive layer and the cover layer is greater than that between the carrier foil and the cover layer.

If this should not be the case, it may be necessary, utilizing minor experimentation, to modify the characteristics at the interfaces by providing, for example, an antiadhesion layer on the carrier foil as described previously.

In such cases, moreover, we may provide the cover layer so that it has reduced adhesion to the material in contact therewith, for example, paper.

In any event, it is important that the multilayer flexible ribbon of the invention comply with certain requirements.

We use the symbol "S" to represent the adhesive force relationship between the different materials. Thus $S_1$ represents the paper or substrate/adhesive layer adhesive force, $S_2$ represents the cover layer/adhesive layer adhesive force, $S_3$ represents the cover layer/carrier-foil strip adhesive force, $S_4$ can represent the cover layer/paper adhesive force and $S_5$ the adhesive layer/-carrier-foil strip adhesive force. Based on these definitions $S_1$ will always be greater than $S_3$, $S_2$ will always be greater than $S_3$, $S_5$ should be smaller than $S_2$ and $S_5$ should be smaller than $S_3$.

Under these conditions, the free surface of the cover layer applied to the substrate, namely, a paper will not be adhesive to overlying sheets of paper, especially where $S_4$ is zero or approaches zero. The cover layer will not be sticky or tacky upon contact by hand or with paper.

To control characteristics of the cover layer at its application to the carrier foil layer and, of course, the properties of the carrier layer once it has been applied to the substrate, various other additives can be included therein. For example, a tear promoting agent can be added. e.g. a cellulose derivative such as methyl or ethyl cellulose, or we can add a mordant or lake forming medium for basic dyes, such as gallic acid derivatives, for example, PRINTAN as marketed by the firm CIBA GEIGY. The carrier foil generally has a thickness of about 10 to 60 μm. especially about 15 to 55 μm. The cover layer may have a thickness of about 5 to 40 μm, especially 15 to 25 μm while the adhesive layer has a thickness of about 1 to 8 μm, especially about 2 to 5 μm.

For optimization of the characteristics of the multilayer flexible ribbon of the invention, the thickness ratio of the adhesive layer to the cover layer should be about 1:6 to 1:12, especially about 1:8 to 1:10.

The process for making the multiflexible ribbon of the invention can make use of a suitable synthetic resin solution which can contain especially a coloring agent and can be applied by conventional coating technology, e.g. by a doctor blade, onto a flexible carrier foil.

The organic solvent of the solution can be evaporated at an elevated temperature to form the cover layer. Upon the latter, an adhesive-containing aqueous dispersion can be applied by conventional coating technology, e.g. by means of a doctor blade or a roll coater to the synthetic-resin-bonded cover layer and, the water from this dispersion can be evaporated to leave the adhesive layer.

The transfer ribbon of the invention can be used to apply practically any desired substance in synthetic-resin-bonded form, i.e. incorporated in the synthetic-resin-bonded cover layer, to a variety of substrates.

The special significance of the ribbon of the invention, however, lies in its suitability for use in office applications for the correction of typewritten, printed or drawn matter on paper substrates.

For this application, we prefer to roll the ribbon onto the paper so that its adhesive side contacts the paper while simultaneously drying off and possibly winding up the carrier foil. This facilitates the application of the cover film consisting of the adhesive and the cover layer to the substrate. This method may be applied utilizing a so-called hand roller which can be of conventional design, but preferably is of the type described in the commonly-owned copending applications, Ser. Nos. 07/120,302 filed Nov. 13, 1987, Ser. No. 07/181,779 filed Apr. 15, 1988 and 07/181,940 filed Apr. 15, 1988.

Such hand rollers comprise a housing having a supply spool carrying the transfer ribbon and a take-up spool upon which the foil is rewound. Between the two spools, the ribbon passes over a pressure member applying the ribbon to the substrate and, a drive is provided between the spools to maintain the ribbon under tension across this pressure member.

The user need only take-up the housing in his or her hand and press its pressure foot against the surface of the substrate in the region to be covered by the cover layer. As the device is drawn across the paper, the adhesive and cover layers are peeled from the foil and cover the track of the device along the paper with the cover layer.

The cover layer can be opaque to obscure underlying print or legible matter, or may simply be used as a color stripe itself. The stripe may fluoresce, for example, in daylight. The foil from which the cover layer and adhesive have been removed is wound up on the take-up spool.

The multilayer flexible transfer ribbon of the invention thus can be used to quickly, easily and uniformly apply cover layers, especially cover layers containing coloring agents, to substrates.

A special value of the invention is that it allows the incorporation of white pigments in such cover layers to be applied as corrective ribbons in office work so that entire sentences, drawing lines or the like may be rapidly covered by a layer which is practically invisible and is so thin that it will not result in marks by photocopying or the like. New legible matter in the form of print, typewriting or drawing lines can be immediately applied without awaiting a drying process.

When chromatic pigments or dyestuffs are used, especially fluorescent dyestuffs, the multilayer flexible ribbon can be used for the rapid and simple marking of practically any substrate. Should the proportion of coloring agent not reduce the cohesion of the cover layer so that it separates at the end of the application step when the devise is drawn away form the substrate, we then include a sufficient tear-promoting agent, especially ethyl cellulose to permit such separation.

SPECIFIC EXAMPLE

For the formation of the synthetic-resin-bonded layer containing the coloring agent, the following dispersion is used:

| | |
|---|---|
| Solvent soluble polyurethane (Permuthane U 4924) (25% in isopropylalcohol/toluene in a volume ratio of 1:1) | 19.0 Parts by Weight |
| Isopropanol | 10.0 Parts by Weight |
| Toluene | 35.0 Parts by Weight |

-continued

| | |
|---|---|
| Mordant (Printan G) | 1.0 Parts by Weight |
| Methylcellulose N7 (tear-promotion agent) | 1.0 Parts by Weight |
| Titanium dioxide pigment (Kronos RN 34) | 29.0 Parts by Weight |
| Aluminum silicate covering promoter P820 | 5.0 Parts by Weight |
| Carbon black (Printex 140V) as tinting agent | 0.01 Parts by Weight |
| | 100.01 Parts by Weight |

The above-described cover mass is applied at a rate of 18 g/m$^2$ with a doctor blade to a silicone-coated carrier foil strip. The solvent is evaporated at 100? C. in a stream of hot air.

Thereafter, also with a doctor blade, an aqueous dispersion of the following composition is applied to the surface of the synthetic-resin-bonded color layer containing the coloring agents:

| | |
|---|---|
| Acrylate-based contact adhesive (synthetic resin dispersion VP 859/6 of the Firm Freihoff and constituted by acrylic acid ester copolymer) | 67.0 Parts by Weight |
| Water | 33.0 Parts by Weight |
| Wetting agent or surfactant (Tenside) (BYK W) | 0.1 Parts by Weight |
| | 100.01 Parts by Weight |

This adhesive composition is applied at a rate of 2 g/m$^2$ and the water is evaporated at 100° C. by passing hot air over it.

The resulting correcting ribbon was found to be highly suitable for covering typewriting on white paper and applied quickly and uniformly a cover film which obscured the underlying print and could readily be written over by typewriting, utilizing the hand-roller of the type described.

We claim:

1. A multilayer flexible transfer ribbon for transferring a cover material to a substrate upon contact therewith, said ribbon comprising:

a flexible carrier-foil strip;

a synthetic-resin bonded cover layer containing said cover material and bonded to said flexible carrier-foil strip; and an adhesive layer of an elastic, tacky pressure-contact adhesive on said synthetic-resin-bonded cover layer and bonded thereto with a bonding force greater than a bonding force bonding said synthetic-resin-bonded cover layer to said carrier-foil strip whereby, upon application of said ribbon to a substrate, said adhesive layer retains said cover layer thereon while said carrier-foil strip is drawn away, thereby covering an area of said substrate with said cover material, said adhesive layer being an organic polymer selected from the group consisting of rubber, polyvinylether, polyvinylisobutylene, acrylate-based polymer and mixtures thereof, and wherein said adhesive layer and said cover layer have relative thicknesses in a ratio of about 1:6 to about 1:12.

2. The multilayer flexible transfer ribbon defined in claim 1 wherein said carrier-foil strip is coated with a substance selected from the group consisting of a silicone, polytetrafluoroethylene and mixtures thereof.

3. The multilayer flexible transfer ribbon defined in claim 1 wherein said synthetic-resin-bonded cover layer comprises a polyurethane as a binder.

4. The multilayer flexible transfer ribbon defined in claim 3 wherein said polyurethane is a single-component aliphatic polyurethane.

5. The multilayer flexible transfer ribbon defined in claim 1 wherein said synthetic-resin-bonded cover layer comprises a coloring agent at least as part of said cover material.

6. The multilayer flexible transfer ribbon defined in claim 5 wherein said coloring agent includes at least one covering pigment.

7. The multilayer flexible transfer ribbon defined in claim 6 wherein said pigment is a white pigment.

8. The multilayer flexible transfer ribbon defined in claim 1 wherein said synthetic-resin-bonded cover layer comprises a tear-promoting agent.

9. The multilayer flexible transfer ribbon defined in claim 8 wherein said tear-promoting agent is ethyl cellulose.

10. The multilayer flexible transfer ribbon defined in claim 1 wherein said cover layer contains a mordant for basic dyestuffs.

11. The multilayer flexible transfer ribbon defined in claim 1 wherein said thickness ratio is about 1:8 to 1:10.

* * * * *